United States Patent [19]
Matchette

[11] Patent Number: 5,199,208
[45] Date of Patent: Apr. 6, 1993

[54] FISHING LURE GUARD

[76] Inventor: Patrick A. Matchette, 650 Sanford St. SW., Palm Bay, Fla. 32908

[21] Appl. No.: 842,542

[22] Filed: Feb. 27, 1992

[51] Int. Cl.⁵ .............................................. A01K 87/00
[52] U.S. Cl. ........................................................ 43/25.2
[58] Field of Search .............................. 43/25.2, 57.1

[56] References Cited

U.S. PATENT DOCUMENTS

| | | | |
|---|---|---|---|
| 1,216,069 | 2/1917 | Cammack | 43/25.2 |
| 2,285,888 | 6/1942 | Benton | 43/25.2 |
| 2,767,502 | 10/1956 | Reynolds | 43/57.1 |
| 3,484,980 | 12/1969 | Wait | 43/57.1 |
| 4,203,245 | 5/1980 | Peterson | 43/25.2 |
| 4,667,433 | 5/1987 | Thompson | 43/25.2 |
| 4,681,220 | 7/1987 | Beneke | 43/25.2 |
| 4,920,683 | 5/1990 | Weber | 43/25.2 |
| 4,944,111 | 7/1990 | Daniel | 43/25.2 |
| 5,056,256 | 10/1991 | Truax | 43/25.2 |

Primary Examiner—Kurt G. Rowan
Attorney, Agent, or Firm—Leon Gilden

[57] ABSTRACT

A guard structure includes an elongate cylindrical housing formed with a first end wall plate diametrically directed over the housing first end wall orthogonally oriented relative to an axis of the housing. The plate includes a slot directed into the plate, with the housing including an elongate housing slot radially aligned with the wall plate slot to permit reception of a fishing line within the wall plate subsequent to positioning a fishing lure within the housing, with a manifold mounted to the housing, with the manifold including entrance and exit ports.

1 Claim, 5 Drawing Sheets

FISHING LURE GUARD

BACKGROUND OF THE INVENTION

1. Field of the Invention

The field of invention relates to fishing lure apparatus, and more particularly pertains to a new and improved fishing lure guard wherein the same provides a guard structure with a first end wall plate and housing, with the plate including a slot directed into the plate to permit reception of a fishing line to position a lure.

2. Description of the Prior Art

A fishing lure remaining unprotected may result in damage to an individual or various material about the fishing structure due to the generally sharpened barb structure utilized in association with fishing lure structure. Prior art fishing lure apparatus has been available but has frequently been of an elaborate construction minimizing its application. Such structure is exemplified in the U.S. Pat. No. 4,765,083 to Wilkins wherein a hinged housing is arranged to secure a fishing lure therewithin.

U.S. Pat. No. 4,763,436 to Lindmeyer sets forth a soft plastic bodied fish guard structure arranged for positioning about a fishing lure.

U.S. Pat. Nos. 4,893,431 to Ehlers and 4,765,086 to Schultz are further examples of fishing lure structure utilized in the prior art.

As such, it may be appreciated that there continues to be a need for a new and improved fishing lure guard as set forth by the instant invention addressing both the problems of ease of use as well as effectiveness in construction and in this respect, the present invention substantially fulfills this need.

SUMMARY OF THE INVENTION

In view of the foregoing disadvantages inherent in the known types of fishing lure guard apparatus now present in the prior art, the present invention provides a fishing lure guard wherein the same is arranged of unitary construction to receive a fishing lure therewithin. As such, the general purpose of the present invention, which will be described subsequently in greater detail, is to provide a new and improved fishing lure guard which has all the advantages of the prior art fishing lure guards and none of the disadvantages.

To attain this, the present invention provides a guard structure including an elongate cylindrical housing formed with a first end wall plate diametrically directed over the housing first end wall orthogonally oriented relative to an axis of the housing. The plate includes a slot directed into the plate, with the housing including an elongate housing slot radially aligned with the wall plate slot to permit reception of a fishing line within the wall plate subsequent to positioning a fishing lure within the housing, with a manifold mounted to the housing, with the manifold including entrance and exit ports.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing lure guard which has all the advantages of the prior art fishing lure guards and none of the disadvantages.

It is another object of the present invention to provide a new and improved fishing lure guard which may be easily and efficiently manufactured and marketed.

It is a further object of the present invention to provide a new and improved fishing lure guard which is of a durable and reliable construction.

An even further object of the present invention is to provide a new and improved fishing lure guard which is susceptible of a low cost of manufacture with regard to both materials and labor, and which accordingly is then susceptible of low prices of sale to the consuming public, thereby making such fishing lure guards economically available to the buying public.

Still yet another object of the present invention is to provide a new and improved fishing lure guard which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
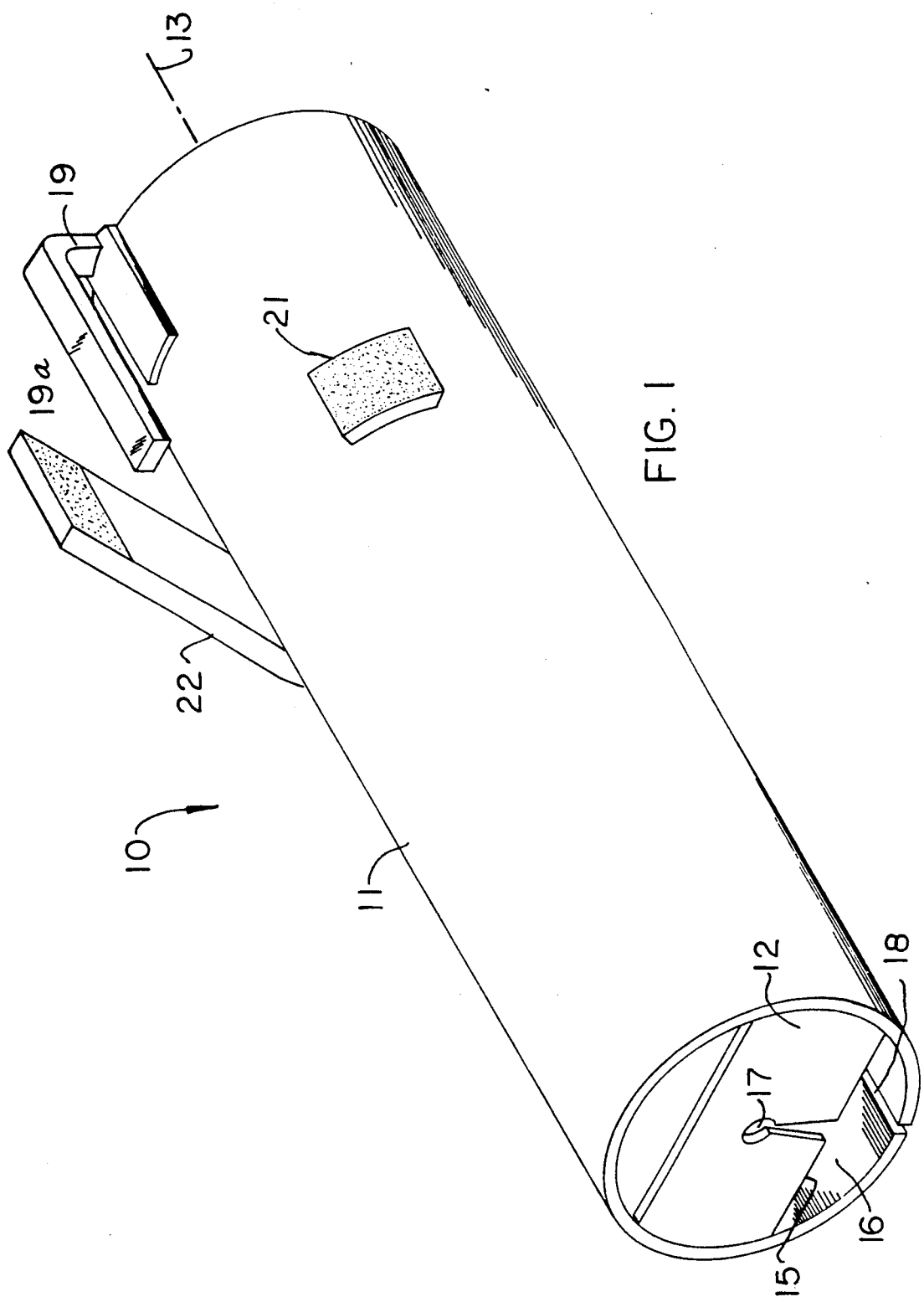
FIG. 1 is an isometric illustration of the instant invention.
Figure 2:
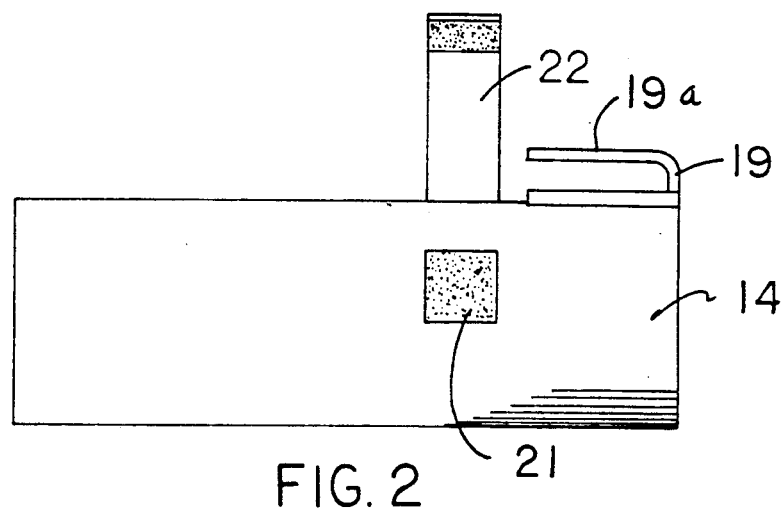
FIG. 2 is an orthographic side view of the instant invention.
Figure 3:
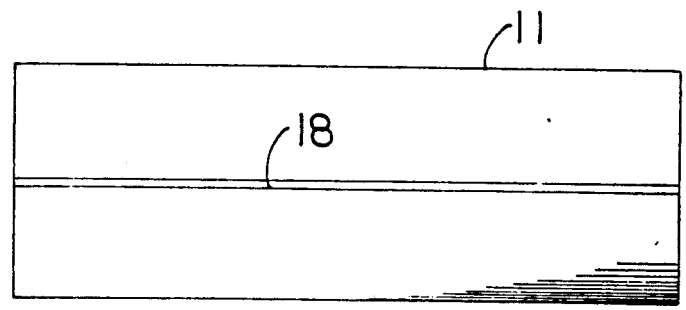
FIG. 3 is an orthographic bottom view of the invention.
Figure 4:
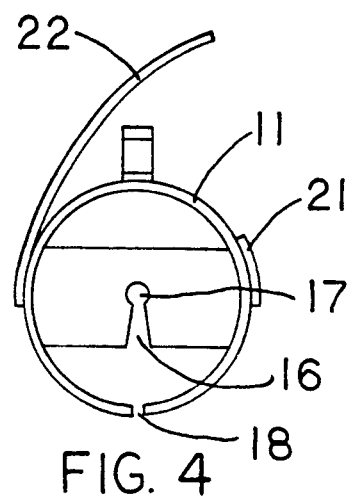
FIG. 4 is an orthographic end view of the instant invention.

With reference now to the drawings, and in particular to FIGS. 1 to 9 thereof, a new and improved fishing lure guard embodying the principles and concepts of the present invention and generally designated by the reference numerals 10 and 10a will be described.

Figure 5:
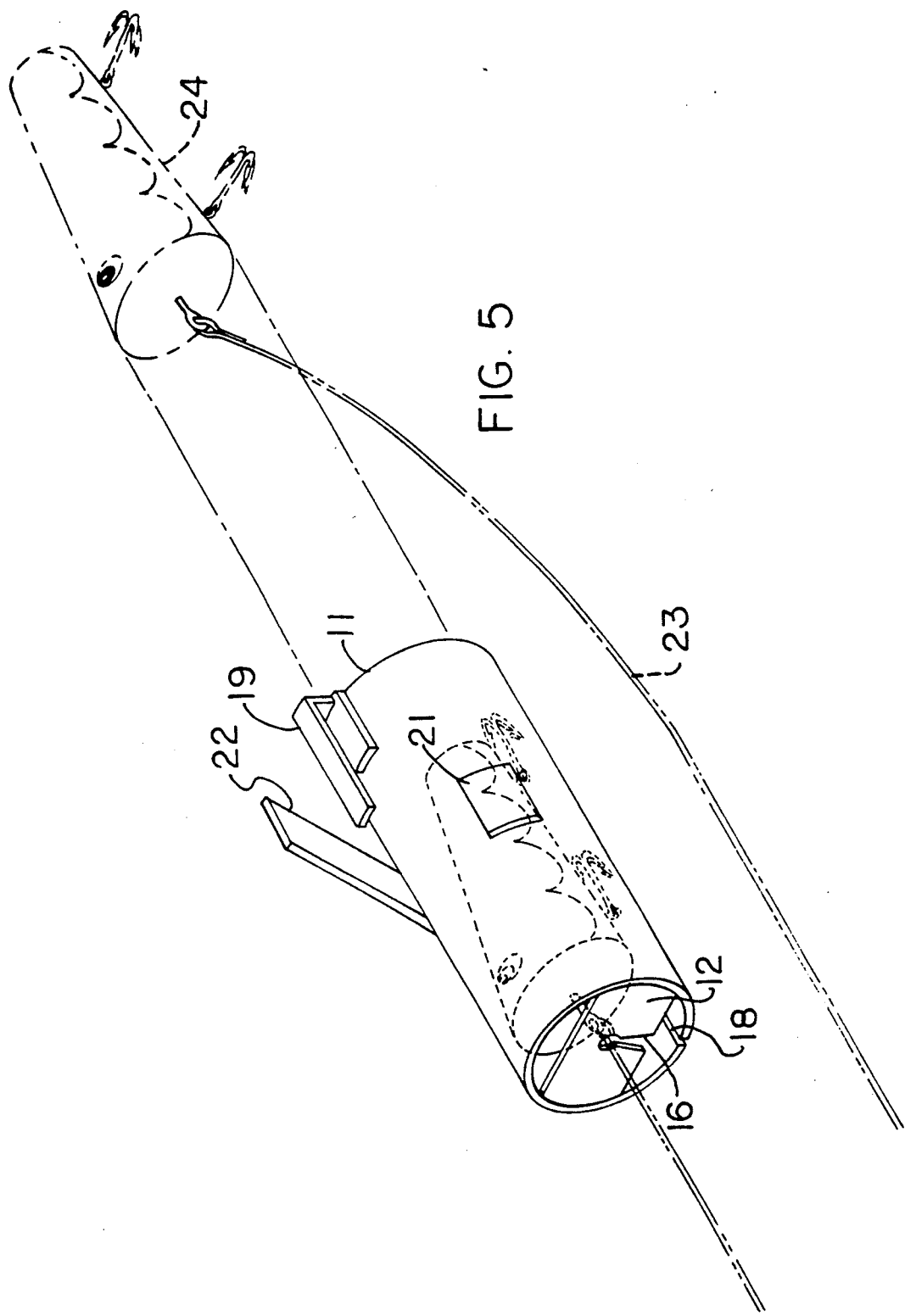
FIG. 5 is an isometric illustration of the invention in use.
Figure 6:
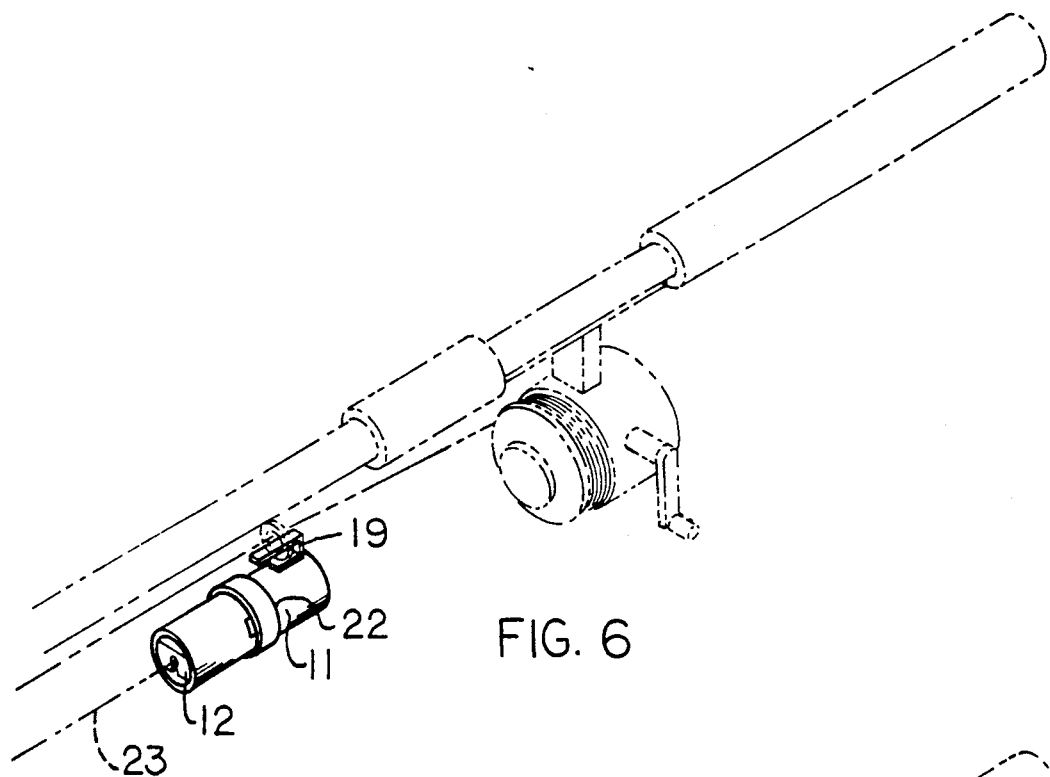
FIG. 6 is an isometric illustration of the invention mounted to a fishing pole in a first position.
Figure 7:
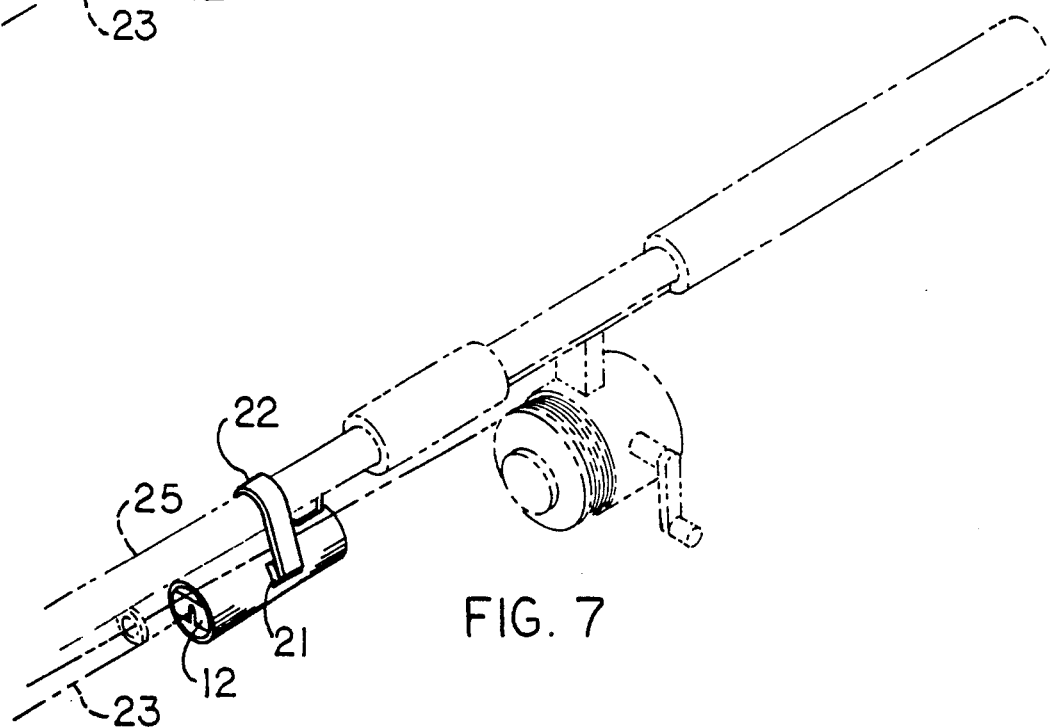
FIG. 7 is an isometric illustration of the invention mounted to the fishing pole in a second position utilizing the flexible strap structure.

More specifically, the fishing lure guard 10 of the instant invention as illustrated in FIG. 1 for example sets forth a cylindrical housing 11 oriented along a housing axis 13. A first end wall plate 12 is fixedly mounted at the first end of the cylindrical housing 11 orthogonally oriented relative to the axis 13, with a second end 14 of the housing 11 of unobstructed and open construction permitting reception of a fishing lure therethrough into the housing 11. The end wall plate 12 includes a plate lower edge 15, with a plate slot 16 positioned medially of the plate lower edge 15 extending into the plate terminating in an annular opening 17 in communication with the plate slot 16 permitting reception of fishing line within the plate, in a manner as illustrated in FIG. 5. A housing slot 18 directed coextensively through the wall of the housing 11 is radially aligned with the plate slot 16 and the annular opening 17. An L-shaped mounting flange 19 is fixedly mounted to the cylindrical housing 11 originating adjacent the second end 14, to include a horizontal leg 19a oriented parallel to the axis 13 positioned above the housing 11 for permitting mounting of the housing relative to an eyelet guide of a fishing rod, in a manner as illustrated in FIG. 6.

Alternatively, a hook and loop fastener patch 21 cooperates with a hook and loop fastener flexible strap 22 that are mounted to opposed sides of the housing 11 permitting positioning of the strap 22 over a fishing rod 25 for securement of the housing 11 to the fishing rod 25. The fishing line 23 with a fishing lure 24 mounted at a distal end of the fishing line 23 is directed into the housing through the housing slot 18 and into the annular opening 17 through the plate slot 16, with the lure directed into the housing 11 by tensioning of the fishing line 23 requiring abutment of the fishing lure adjacent the first end wall plate 12, in a manner as illustrated in FIG. 5.

Figure 8:
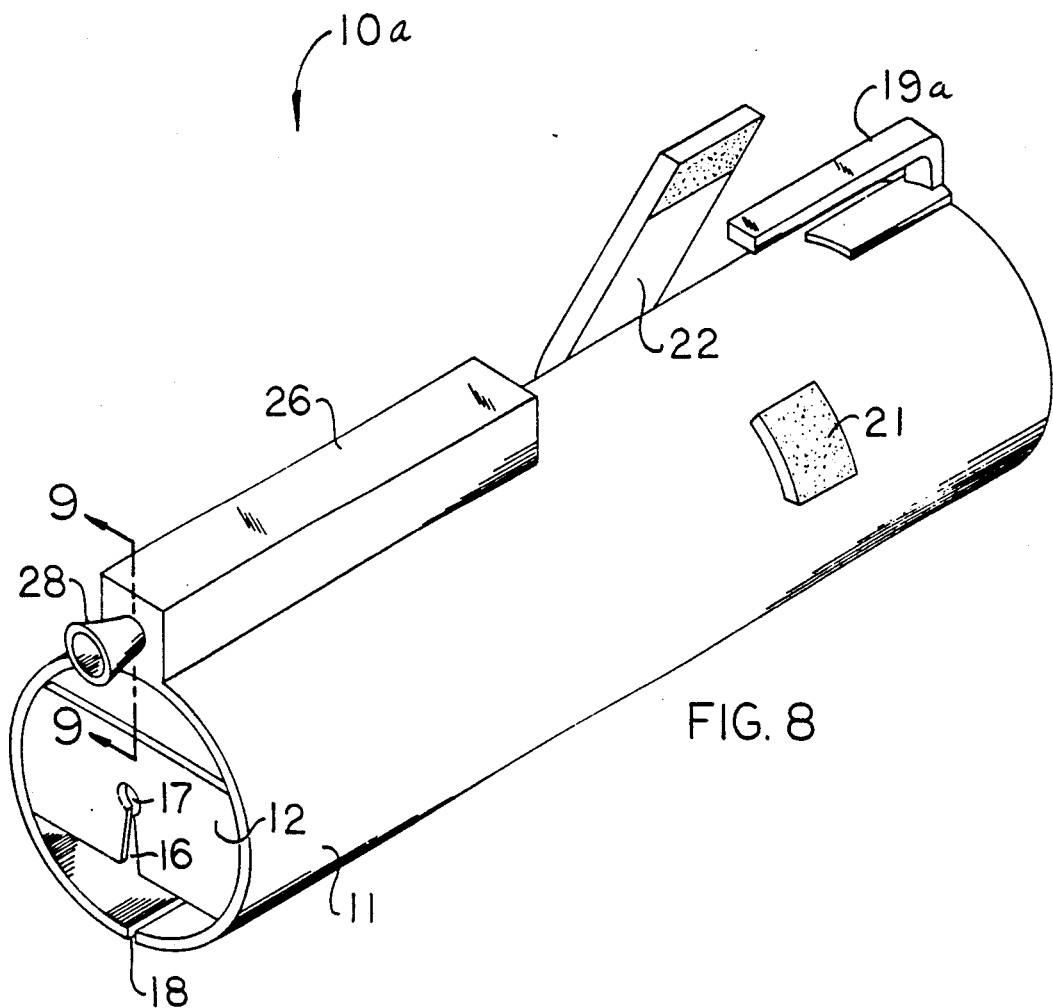
FIG. 8 is an isometric illustration of a modification of the invention.
Figure 9:
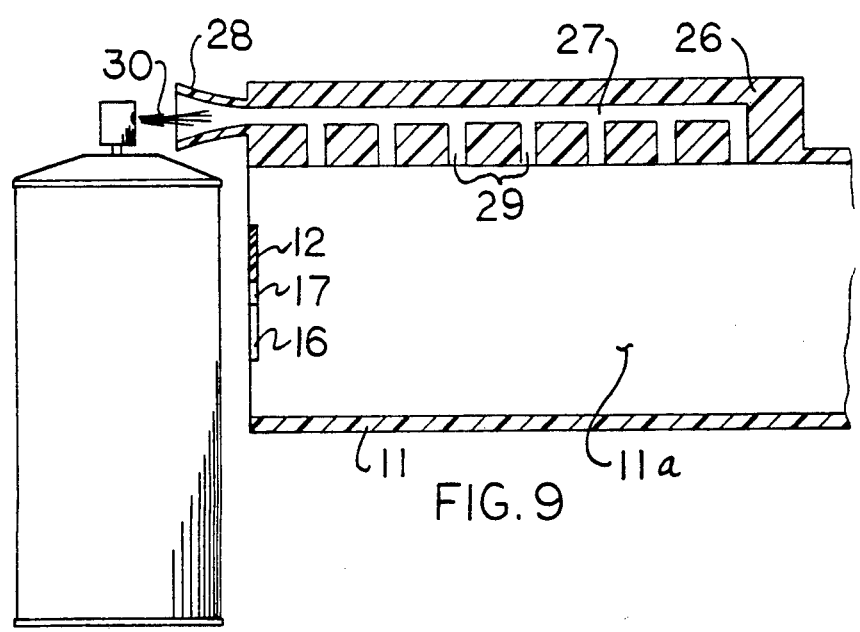
FIG. 9 is an orthographic cross-sectional illustration of the invention, taken along the lines 9—9 of FIG. 8 in the direction indicated by the arrows.

The invention employs a modified apparatus 10a, as illustrated in the FIGS. 8 and 9, to include a manifold 26 mounted to the housing 11 fixedly thereto adjacent the first end of the housing, to include a manifold conduit 27 directed through the manifold, to include a conical conduit entrance guide 28 fixedly mounted adjacent the manifold projecting beyond the housing first end permitting directing of a fish attractant fluid 30 into the conduit 27, with the attractant fluid 30 directed onto a lure 24 that is contained within the housing through the exit ports 29 that are in fluid communication with the conduit 27 and are directed through the housing 11 into the housing cavity 11a.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing lure guard, comprising, an elongate cylindrical housing, the cylindrical housing defined about a housing axis, the housing including a first end spaced from a second end, the first end including a wall plate fixedly mounted within the first end orthogonally oriented relative to the housing, with the second end defining an entrance opening, and the wall plate including a wall plate lower edge, and a plate slot directed into the wall plate extending from the lower edge, with the slot terminating in an annular opening, and a housing slot directed through the cylindrical housing, with the housing slot radially aligned with the plate slot and the annular opening, with the housing slot coextensive with the cylindrical housing, the cylindrical housing defining a cavity therewithin coextensive with the housing extending from the first end to the second end, and an L-shaped mounting flange fixedly secured to the cylindrical housing adjacent the second end, with the mounting flange including a horizontal leg, the horizontal leg positioned above the cylindrical housing and parallel to the housing axis, and a hook and loop fastener patch mounted to an exterior surface of the cylindrical housing positioned between the first end and the second end, and a flexible fastener strap including a second hook and loop fastener patch secured to the strap spaced from the hook and loop fastener patch permitting securement of the strap about an associated fishing rod, and a manifold fixedly mounted to an exterior surface of the cylindrical housing, the manifold including a manifold conduit directed through the manifold, and the manifold conduit including a conical entrance guide coaxially aligned with the manifold conduit, with the entrance guide projecting beyond the first end to direct a fish attractant fluid into the manifold conduit, and a plurality of exit ports in fluid communication with the manifold conduit, with the exit ports directed into the cylindrical housing from the manifold conduit.

* * * * *